March 28, 1933.  C. W. ROBINSON  1,902,897
ROD WEEDER SHOE
Filed Dec. 18, 1931
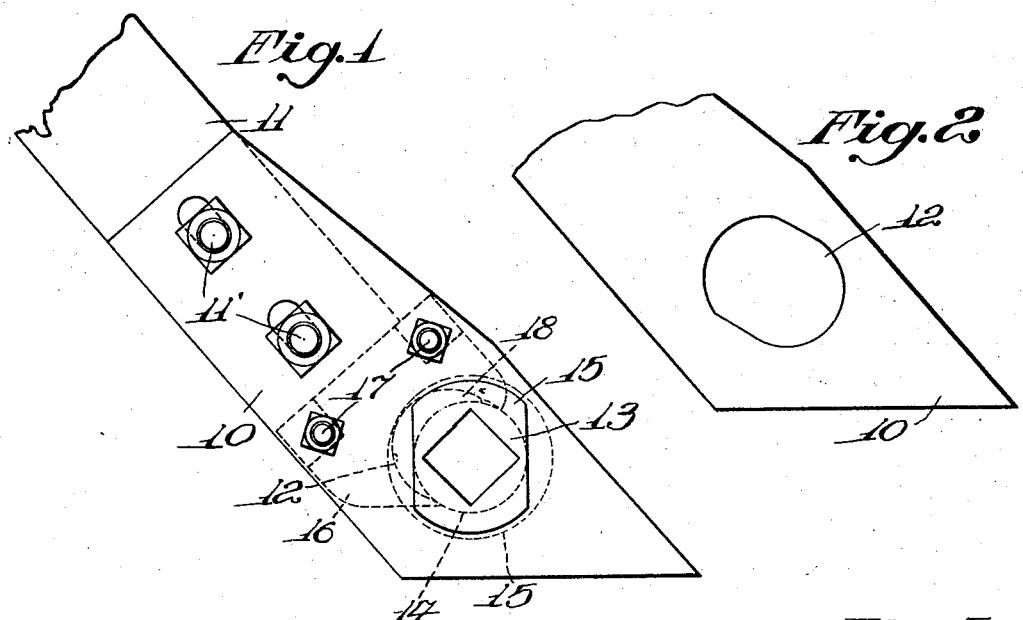
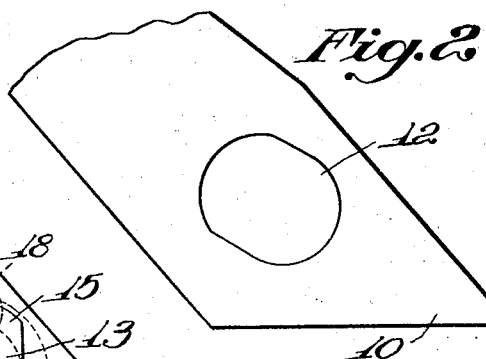
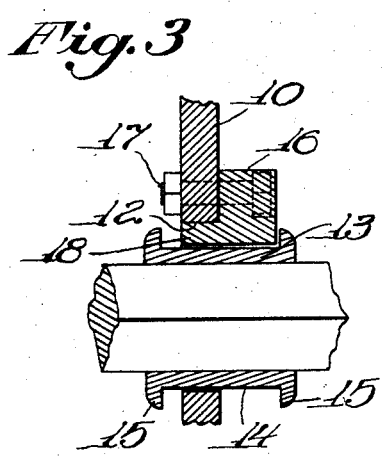
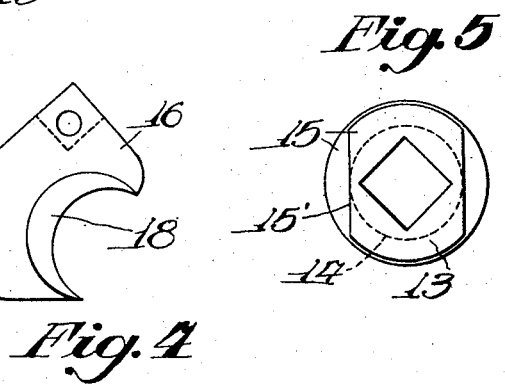
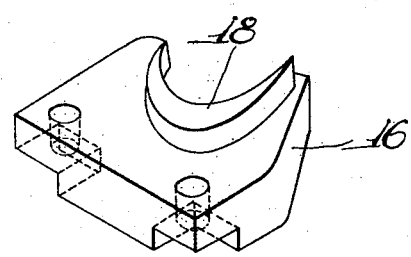
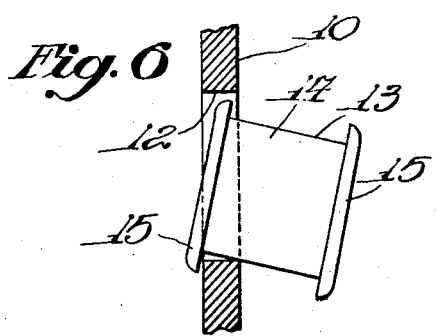
Inventor
Charles W. Robinson
By H. P. Doolittle
Atty.

Patented Mar. 28, 1933

1,902,897

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

ROD WEEDER SHOE

Application filed December 18, 1931. Serial No. 581,828.

This invention relates to a rotary rod weeder. More specifically it relates to a shoe construction for rotatably supporting a weeder rod.

The principal object of the invention is to provide an improved rod weeder shoe or point having the property of easy penetration into the soil and having a bearing operable beneath the surface of the soil which is constructed to reduce wear and the difficulties encountered from freezing of the bearing, to a minimum.

Another object is to provide a construction requiring a minimum amount of machine work and material. Another object is to provide a bearing having sufficient strength and wearing surface on the rear side of the shaft bearing without making the forward side unnecessarily heavy and closed whereby the escape of dirt would be prevented.

The objects of the invention are accomplished by a construction such as illustrated. A flat metal shoe, adapted to operate with the thin portion in a vertical direction, is provided with a narrow integral bearing portion for a journal member having a wide area of contact and a removable bearing block particularly adaptable for this bearing.

In the drawing:

Figure 1 is a side elevation showing a rod weeder shoe and the lower portion of a shank to which it is attached;

Figure 2 is a plan view illustrating the opening formed in the shoe for insertion of a journal member;

Figure 3 is a sectional view showing a journal member in position in the shoe and a bearing member which holds the bearing in position and provides a wide bearing surface;

Figure 4 is a plan view of the bearing member, showing the side on which an extension is formed;

Figure 5 is an end view of the journal member;

Figure 6 is a sectional view showing one of the journal members being inserted in the shoe; and Figure 7 is a perspective view of the bearing member.

In the device of this invention, as illustrated in the drawing, a rod weeder shoe or point 10 is rigidly secured to the shank 11 of a rod weeder. As shown in Figure 2, the shoe 10 is formed with an opening 12 in the form of a short slot extending in a fore and aft direction. The ends of said slot are semi-cylindrical in shape for a purpose to be hereinafter described. The shoe or point 10 is secured to the shank 11 by a plurality of bolts 11'. Figure 3 shows a portion of a weeder rod with a journal member 13 in place on the shaft. The journal member 13 has an opening through the center by which means it is secured to the weeder rod.

In the particular embodiment shown the weeder rod is square in cross section and the opening in the journal member is made the same whereby the member is slidably and non-rotatably secured on the rod. The journal member is provided with a center portion 14, which is formed as a plain cylindrical bearing surface. At each end of the portion 14 annular flanges 15 are provided at substantially right angles to the axis of the journal member. As best shown in Figure 5, one of the flanges 15 is cut away at the sides at opposite points for a purpose to be hereinafter described. The journal member is of such a size relative to the slot 12, that the end at which the flanges are cut away may be inserted in the slot by first tilting and inserting one side. When the journal member is in position it is pushed forwardly in the slot 12. With said member in position, an opening is left rearwardly thereof in the slot 12.

It is to be understood that the shoe 10 is to be formed of comparatively thin material, that is, three-eights to one-half inch in thickness. It is obvious that a bearing would not wear long with such a small surface. To provide for an increased bearing surface and for locking the journal member in position, a bearing member 16 has been devised. Said member consists of a portion adapted to be secured by bolts 17 to the shoe 10. As shown in the perspective in Figure 7, the member 16 is provided with an arcuate, laterally extending flange 18. Said flange extends the bearing surface of the member 16 within the shoe with the result that the bearing surface is substantially the same width as the bearing surface 14 on the journal member 13. The arcuate flange 18 is laterally formed so that it may be inserted behind the journal member 13 when said member is in position in the slot 12 and said flange is of sufficient width to fill the portion of the slot not occupied by the journal member.

In assembling and operating a shoe or point of the type above described, the shoe or point 10 is bolted to the shank 11. One of the spools or journal members 13 is inserted into said slot. The removed portions of the journal member, indicated by the flat portions 15' on one of the flanges, permit the insertion of said member through the slot 12. The journal member is then pushed forwardly in the slot and a bearing member 16 is put into position, the flange portion 18 of said member fitting between the journal member and the rear portion of the slot 12. As previously stated, the cylindrical bearing surface formed on the face of the bearing member 16 is of a sufficient length to substantially cover the journal member between the two flanges. The bearing member is secured in position by the bolts 17. By this construction a wide bearing surface is provided at the back of the journal member where the pressure is applied, and a narrow bearing surface is formed at the front by the thin shoe 10. There is nothing to form a binding accumulation of dirt around the journal member, and the dirt rolls out from the bearing member as fast as it enters, thereby preventing freezing of the moving parts.

It will be understood that the bearing member may be removed without altering the adjustment of the shoe on its carrying shank by loosening the two bolts 17.

It will be understood that applicant has shown and described only a preferred embodiment of his improved rod weeder shoe and claims as his invention all modifications falling within the scope of the appended claims.

What is claimed is:

1. A rod weeder shoe comprising a flat thin shoe member substantially uniform in thickness, a transverse opening formed therein, a rotatable journal member extending through said opening, said shoe member forming a narrow bearing surface at the front of said journal member, and a bearing member removably supported on the shoe member and presenting a wide bearing surface at the rear of the journal member.

2. A rod weeder shoe comprising a comparatively thin pointed shoe adapted to be secured to a shank, an opening formed in said shoe, said opening being formed as a short fore and aft extending slot semi-cylindrical at each end, a weeder rod journal member having an opening therethrough, a cylindrical bearing surface and annular flanges at each end of said surface, said flanges being of such a size that the journal can be inserted through the slot by first placing one side of one flange over one side of the slot, and a bearing member, said member having a forwardly formed bearing face shaped to fit the surface on the journal member and extending axially between the flanges thereon, said bearing member having a portion secured to the shoe and a portion forming the bearing face which extends through the slot rearwardly of the journal member.

3. A rod weeder shoe comprising a comparatively thin pointed shoe adapted to be secured to a shank, an opening formed in said shoe, said opening being formed as a short fore and aft extending slot semi-cylindrical at each end, a weeder rod journal member having an opening therethrough, a cylindrical bearing surface and annular flanges at each end of said surface, the flanges at one end being cut away at diametrically opposite locations substantially tangent to the cylindrical bearing surface whereby the journal member may be inserted through the slot, and a bearing member, said member having a forwardly formed bearing face shaped to fit the surface on the journal member and extending axially between the flanges thereon, said bearing member having a portion secured to the shoe and a portion forming the bearing face which extends through the slot rearwardly of the journal member.

4. A rod weeder shoe comprising a comparatively thin pointed shoe adapted to be secured to a shank, an opening formed in said shoe, said opening being formed as a short fore and aft extending slot semi-cylindrical at each end, a weeder rod journal member having an opening therethrough, a cylindrical bearing surface and annular flanges at each end of said surface, the flange at one end being cut away at diametrically opposite locations substantially tangent to the bearing surface whereby the width of the journal member at that end is substantially the same as the diameter of the bearing surface, said construction permitting the insertion of the journal member through the slot in the shoe by first placing one end of one of the remaining portions of the flange over one of the end portions of the slot, and a bearing member, said member having a forwardly formed bearing face shaped to fit the surface of the journal member and extending axially between the flanges thereon, said bearing member having a portion secured to the shoe and a portion forming the bearing face which extends through the slot rearwardly of the journal member.

In testimony whereof I affix my signature.

CHARLES W. ROBINSON.